US007980718B2

(12) United States Patent
Takata

(10) Patent No.: US 7,980,718 B2
(45) Date of Patent: Jul. 19, 2011

(54) ILLUMINATING DEVICE, DISPLAY DEVICE HAVING IT, AND TELEVISION RECEIVER

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/593,070

(22) PCT Filed: Jan. 8, 2008

(86) PCT No.: PCT/JP2008/050065
§ 371 (c)(1),
(2), (4) Date: Sep. 25, 2009

(87) PCT Pub. No.: WO2008/142871
PCT Pub. Date: Nov. 27, 2008

(65) Prior Publication Data
US 2010/0110667 A1    May 6, 2010

(30) Foreign Application Priority Data

May 10, 2007    (JP) ................................ 2007-125154

(51) Int. Cl.
*F21V 33/00*    (2006.01)
(52) U.S. Cl. ............... 362/97.3; 362/249.02; 362/249.06
(58) Field of Classification Search ................. 362/97.1, 362/97.2, 97.3, 249.02, 249.06
See application file for complete search history.

(56) References Cited

U.S. PATENT DOCUMENTS

| 7,229,194 B2* | 6/2007 | Liu et al. | 362/225 |
| 7,572,026 B2* | 8/2009 | Park | 362/97.3 |
| 7,635,194 B2* | 12/2009 | Kim et al. | 362/97.3 |
| 2006/0158080 A1* | 7/2006 | Nakano et al. | 313/113 |
| 2009/0207339 A1* | 8/2009 | Ajichi et al. | 349/64 |
| 2009/0290094 A1* | 11/2009 | Shimura et al. | 349/62 |

FOREIGN PATENT DOCUMENTS

| JP | 2000-133006 A | 5/2000 |
| JP | 2002-170402 A | 6/2002 |
| JP | 2004-111189 A | 4/2004 |
| JP | 2005-285620 A | 10/2005 |
| JP | 2006-228710 A | 8/2006 |
| JP | 2006-301209 A | 11/2006 |
| WO | 2007/043211 A1 | 4/2007 |

OTHER PUBLICATIONS

Official Communication issued in International Patent Application No. PCT/JP2008/050065, mailed on Apr. 1, 2008.

* cited by examiner

*Primary Examiner* — Laura Tso
(74) *Attorney, Agent, or Firm* — Keating & Bennett, LLP

(57) ABSTRACT

A thin, lightweight illuminating device, in the form of a backlight unit, is capable of securing even brightness and improving light use efficiency. The backlight unit includes a light source including a plurality of light emitting diodes mounted on a mounting surface of a board, a diffusion plate which has a light introduction surface that faces the mounting surface of the board at a predetermined distance therefrom and diffuses the light emitted from the plurality of light emitting diodes, and a reflection sheet that is adhered to the mounting surface of the board. A light emission direction of the plurality of light emitting diodes is parallel or substantially parallel to the light introduction surface of the diffusion plate.

9 Claims, 5 Drawing Sheets

ILLUMINATING DEVICE, DISPLAY DEVICE HAVING IT, AND TELEVISION RECEIVER

BACKGROUND OF THE INVENTION

1. Field of the Invention

The present invention relates to an illuminating device, and a display device and a television receiver that have the illuminating device. More particularly, the present invention relates to an illuminating device provided with a light source, and a display device and a television receiver having the illuminating device.

2. Description of the Related Art

Conventionally, as illuminating devices, backlight units used in display devices (such as television receivers) have been known (see, for example, JP-A-2005-285620).

FIG. 7 is a diagram schematically showing an example of the structure of a liquid crystal display device (display device) in which a conventional backlight unit (illuminating device) is used. As shown in FIG. 7, a liquid crystal display device (display device) using a conventional backlight unit (illuminating device) 110 is used in a state in which the backlight unit 110 is disposed on the rear surface side of a liquid crystal display panel 120. The conventional backlight unit 110 is so designed as to irradiate the liquid crystal display panel 120 with planar light from the rear surface side of the liquid crystal display panel 120. Hereinafter, a description will be given of the structure of the conventional backlight unit.

The conventional backlight unit (illuminating device) 110 is provided at least with a reflection sheet 101, a plurality of fluorescent lamps 102 forming a light source, and a diffusion plate 103. The reflection sheet 101 is disposed so as to cover the plurality of fluorescent lamps 102 from the rear surface side. The reflection sheet 101 has a function of reflecting light from the plurality of fluorescent lamps 102 toward the front surface side.

The plurality of fluorescent lamps 102 are each disposed to extend in a direction perpendicular to the paper plane of FIG. 7. Furthermore, the plurality of fluorescent lamps 102 are arranged at predetermined intervals in a direction perpendicular to the direction in which the fluorescent lamps 102 extend (the right-left direction in FIG. 7). It is by the plurality of fluorescent lamps 102 that light which is to be emitted from the backlight unit 110 is generated.

The diffusion plate 103 is disposed at a predetermined distance from the fluorescent lamps 102 so as to cover the plurality of fluorescent lamps 102 from the front surface side. The diffusion plate 103 has a function of making images of the fluorescent lamps 102 invisible by diffusing the light from the plurality of fluorescent lamps 102.

In the conventional backlight unit 110 shown in FIG. 7, in order to make the images of the fluorescent lamps 102 invisible, the ratio (B/A) of distance A (the distance from the centers of the fluorescent lamps 102 to the rear surface of the diffusion plate 103) to distance B (the distance between the centers of adjacent ones of the fluorescent lamps 102) needs to be large to some extent. In other words, in order to make the images of the fluorescent lamps 102 invisible to secure even brightness, distance A (the distance from the centers of the fluorescent lamps 102 to the rear surface of the diffusion plate 103) needs to be large to some extent. As a result, inconveniently, in the conventional backlight unit 110 shown in FIG. 7, it is difficult to reduce distance A (the distance from the centers of the fluorescent lamps 102 to the rear surface of the diffusion plate 103) to achieve thinness.

A conventionally proposed solution for coping with this inconvenience is a backlight unit in which a light guide plate is used to reduce its thickness.

FIG. 8 is a diagram schematically showing an example of the structure of the just-mentioned conventionally proposed backlight unit. As shown in FIG. 8, the conventionally proposed backlight unit 130 is provided at least with a plurality of fluorescent lamps 111, a plurality of light guide plates 112 each making a pair with a corresponding one of the fluorescent lamps 111, and a diffusion plate 113. The plurality of fluorescent lamps 111 are each disposed to extend in a direction perpendicular to the paper plane of the figure, and also, they are arranged at predetermined intervals in a direction perpendicular to the direction in which the fluorescent lamps 111 extend (the right-left direction in FIG. 8).

The plurality of light guide plates 112 each have a light entrance surface 112a formed as a predetermined side surface, and are formed in the shape of a wedge that is progressively thinner farther away from the light entrance surface 112a. The plurality of light guide plates 112 are arranged in the direction in which the fluorescent lamps 111 are arranged (the right-left direction in FIG. 8) without a gap, such that the light entrance surface 112a of each of the light guide plate 112 faces a corresponding one of the fluorescent lamps 111.

The plurality of light guide plates 112 each have a light exit surface 112b formed as its front surface. The diffusion plate 113 is disposed so as to cover the light exit surfaces 112b of the plurality of light guide plate 112 from the front surface side.

Incidentally, a conventional backlight unit 130 shown in FIG. 8 is, like the conventional backlight unit 110 shown in FIG. 7, used in a state in which it is disposed on the rear surface side of the liquid crystal display panel 120.

With the conventional backlight unit 130 shown in FIG. 8, since light from each of the plurality of fluorescent lamps 111 is guided to the diffusion plate 113 after being diffused by the corresponding one of the light guide plates 112, it is possible to make the images of the fluorescent lamps 111 invisible even when distance A (the distance from the centers of the fluorescent lamps 111 to the rear surface of the diffusion plate 113) is reduced.

However, although the images of the fluorescent lamps 111 can be made invisible with the conventional backlight unit 130 shown in FIG. 8, there arises another inconvenience that brightness is high at connection portions 112c that are each a portion between adjacent light guide plates 112. Thus, when the conventional backlight unit 130 is used in a state in which distance A (the distance from the centers of the fluorescent lamps 111 to the rear surface of the diffusion plate 113) is reduced, it is difficult to obtain even brightness that is required of backlight units for liquid crystal display devices. That is, it is disadvantageously difficult to improve the evenness of the brightness of the conventional backlight unit 130 while reducing its thickness.

Furthermore, the conventional backlight unit 130 shown in FIG. 8 is disadvantageous in that the plurality of light guide plates 112 used therein make the backlight unit 130 heavier due to their respective weights. Moreover, the conventional backlight unit 130 shown in FIG. 8 is disadvantageous in that the light guide plates 112 absorb light, and this degrades the light use efficiency.

SUMMARY OF THE INVENTION

In view of the problems described above, preferred embodiments of the present invention provide a thin, light-weight illuminating device capable of securing even brightness and improving light use efficiency, and a display device and a television receiver having such an illuminating device.

According to a first preferred embodiment of the present invention, an illuminating device includes a light source including of a plurality of light emitting diodes disposed on a mounting surface of the base at a mounting location; an optical sheet having a light introduction surface that is located facing and at a predetermined distance from the mounting location of the base, and being arranged to at least diffuse light emitted from the plurality of light emitting diodes; and a first reflection member that is provided on the mounting surface of the base, and that is arranged to reflect light emitted from the plurality of light emitting diodes toward the optical sheet. Here, a light emission direction of the plurality of light emitting diodes is a direction that is parallel or substantially parallel to the light introduction surface of the optical sheet. Note that, in this application, the light emission direction of a light emitting diode is a direction in which the light emitting diode emits light of the highest brightness.

In the illuminating device according to the first preferred embodiment of the present invention, as just described, since the light source preferably includes a plurality of light emitting diodes and the light emission direction of the plurality of light emitting diodes of the light source is set to be parallel or substantially parallel to the light introduction surface of the optical sheet, light emitted from the light source (the plurality of light emitting diodes) is diffused in a direction parallel or substantially parallel to the light introduction surface of the optical sheet. This makes it possible to make the image of the light source (the plurality of light emitting diodes) invisible even when the distance between the light source (the plurality of light emitting diodes) and the optical sheet is reduced. Thus, the illuminating device according to the first preferred embodiment of the present invention can be thin and secure even brightness at the same time. Furthermore, light emitted from the light source (the plurality of light emitting diodes) is diffused in a direction parallel or substantially parallel to the light introduction surface of the optical sheet, and this eliminates the need of using a light guide plate. This helps prevent inconveniences (increased weight and lowered light use efficiency) attributable to the use of a light guide plate.

Thus, according to the first preferred embodiment of the present invention, it is possible to secure even brightness and improve light use efficiency while reducing thickness and weight.

In the illuminating device according to the first preferred embodiment described above, it is preferable that the light emission direction of the plurality of light emitting diodes include a plurality of directions parallel or substantially parallel to the light introduction surface of the optical sheet. With this structure, it is possible to diffuse light emitted from the plurality of light emitting diodes in a plurality of directions parallel or substantially parallel to the light introduction surface of the optical sheet. As a result, the evenness of brightness can be further improved.

In the illuminating device according to the first preferred embodiment described above, it is preferable that the plurality of light emitting diodes be divided into a first light emitting diode row and a second light emitting diode row that each include two or more light emitting diodes arranged in a row, that a light emission direction of the two or more light emitting diodes included in the first light emitting diode row be a first direction that is parallel or substantially parallel to the light introduction surface of the optical sheet and that extends along a row direction, and that a light emission direction of the two or more light emitting diodes included in the second light emitting diode row be a second direction that is parallel or substantially parallel to the light introduction surface of the optical sheet and that is opposite to the first direction along the row direction. With this structure, it is possible to easily diffuse light emitted from the plurality of light emitting diodes in a plurality of directions that are parallel or substantially parallel to the light introduction surface of the optical sheet.

In this case, it is preferable that the first and second light emitting diode rows be arranged alternately in a direction perpendicular or substantially perpendicular to the row direction. With this structure, in a case in which a plurality of light emitting diodes are divided into a first light emitting diode row and a second light emitting diode row, even diffusion of light can be easily achieved.

It is preferable that the above structure in which the plurality of light emitting diodes are divided into the first and second light emitting diode rows further include a second reflection member provided on a side opposite to light emitting surfaces of the light emitting diodes, and that the second reflection member have a taper-shaped reflection surface for reflecting light proceeding to the light emitting diodes toward the optical sheet. With this structure, it is possible to prevent brightness from being lowered in vicinities of portions on the sides opposite to the light emitting surface sides of the light emitting diodes.

In the above illuminating device according to the first preferred embodiment, it is preferable that the plurality of light emitting diodes be divided into a predetermined number of light emitting diode groups that each include two or more light emitting diodes that are located close to one another, and that light emission directions of the two or more light emitting diodes included in each of the predetermined number of light emitting diode groups be parallel or substantially parallel to the light introduction surface of the optical sheet and different from one another. With this structure, it is possible to easily diffuse light emitted from the plurality of light emitting diodes in a plurality of directions parallel or substantially parallel to the light introduction surface of the optical sheet. Furthermore, since the two or more light emitting diodes are located close to one another, power can be easily supplied to the two or more light emitting diodes that are located close to one another.

In the above illuminating device according to the first preferred embodiment, it is preferable that the plurality of light emitting diodes be designed to emit blue light, and that the optical sheet include a layer containing a fluorescent substance for converting a wavelength of the blue light emitted from the plurality of light emitting diodes into a wavelength of white light. With this structure, it is possible to convert the wavelength of the blue light emitted from the plurality of light emitting diodes into a wavelength of white light by use of the same one layer (the layer containing the fluorescent substance for converting a wavelength of blue light into a wavelength of white light). This helps prevent an inconvenience such as unevenness of color from occurring.

According to a second preferred embodiment of the present invention, a display device includes the illuminating device of any one of the preferred embodiments described above. This structure makes it possible to easily obtain a thin and lightweight display device capable of securing even brightness and improving light use efficiency.

According to a third preferred embodiment of the present invention, a television receiver includes the illuminating device of any one of the preferred embodiments described above. This structure makes it possible to easily obtain a thin and lightweight television receiver capable of securing even brightness and improving light use efficiency.

As described above, according to various preferred embodiments of the present invention, it is possible to easily obtain a thin and lightweight illuminating device capable of securing even brightness and improve light use efficiency, and a display device and a television receiver having such an illuminating device.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, descriptions will be given of preferred embodiments of the present invention with reference to the accompanied drawings.

First Preferred Embodiment

First, with reference to FIGS. 1 to 3, descriptions will be given of the structure of a backlight unit (illuminating device) according to a first preferred embodiment and the structure of a liquid crystal display device (display device) using the backlight unit. FIG. 2 is a sectional view taken along line 100-100 in FIG. 3.

Figure 1:
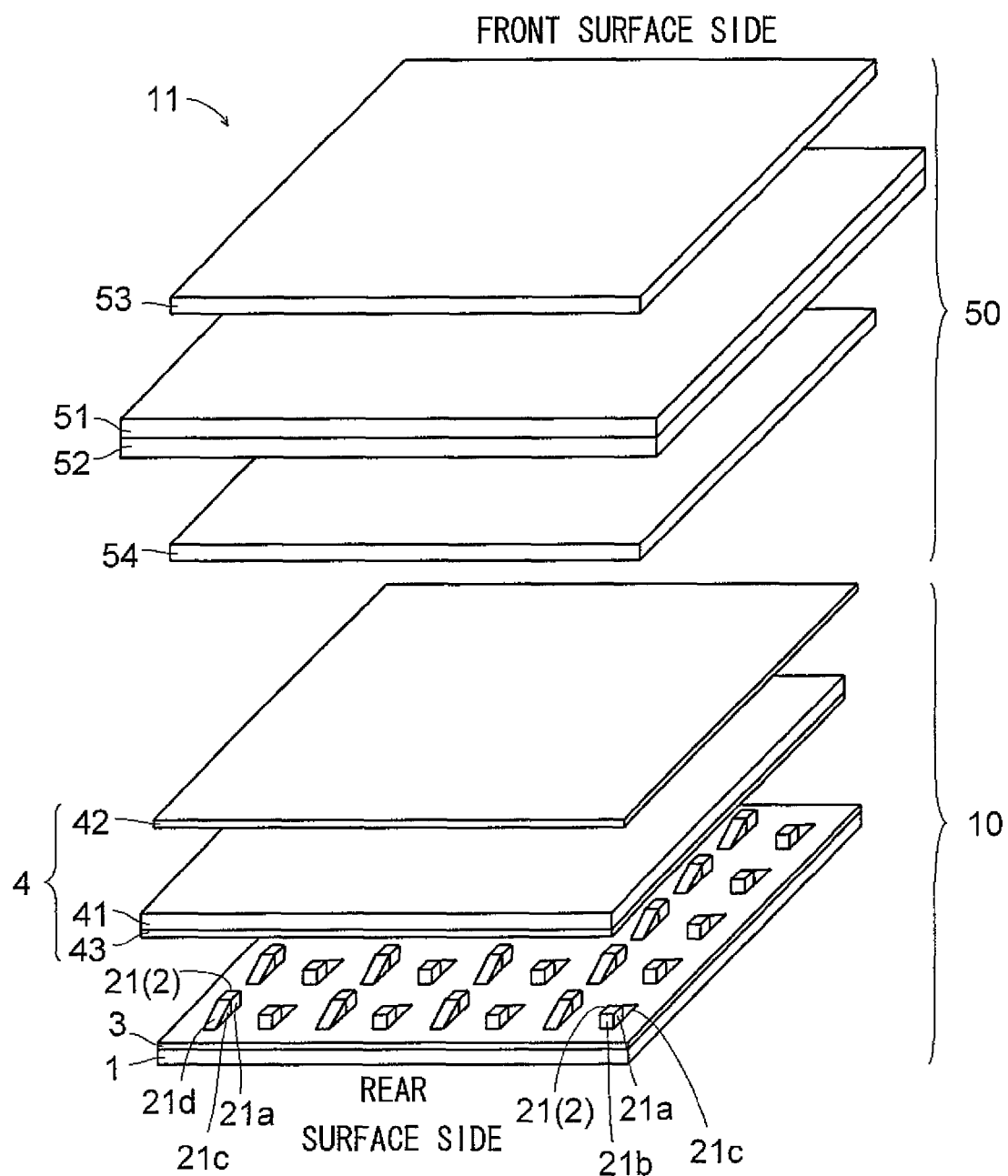
FIG. 1 is an exploded perspective view of a liquid crystal display device (display device) using a backlight unit (illuminating device) according to a first preferred embodiment of the present invention.
Figure 2:
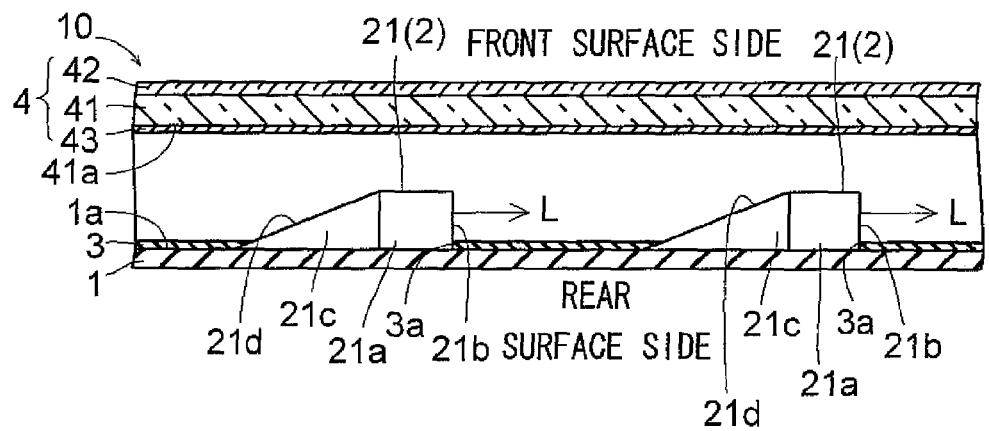
FIG. 2 is a sectional view for illustrating in detail the structure of the backlight unit according to the first preferred embodiment shown in FIG. 1.

As shown in FIG. 1, in a liquid crystal display device (display device) 11 using a backlight unit (illuminating device) 10 of the first preferred embodiment, the backlight unit 10 is used in a state in which it is disposed on a rear surface side of a liquid crystal display panel 50. And the backlight unit 10 of the first preferred embodiment is designed to emit planar light from the rear surface side of the liquid crystal display panel 50 to irradiate the liquid crystal display panel 50 with the planar light. Now, the structure of the backlight unit 10 of the first preferred embodiment will be described in detail.

The backlight unit 10 of the first preferred embodiment is provided at least with a board 1, a light source 2, a reflection sheet 3, and an optical sheet 4. The board 1 is an example of a "base" according to a preferred embodiment of the present invention, and the reflection sheet 3 is an example of a "first reflection member" according to a preferred embodiment of the present invention. Although not shown, the above-mentioned members (1 to 4) constituting the backlight unit 10 are accommodated in a case member formed of a metal plate, formed as a molded resin article, or the like.

As shown in FIGS. 1 and 2, of all the members (1 to 4) constituting the backlight unit 10, the board 1 is placed at a most rear-surface-side position. Furthermore, the front surface of the board 1 is a mounting surface 1a on which electronic components are mounted. Incidentally, the mounting surface 1a is an example of a "placement surface" according to a preferred embodiment of the present invention.

The light source 2 preferably includes a plurality of light emitting diodes 21 that emit blue light and are mounted on the mounting surface 1a of a same one board 1. Light emitted from the backlight unit 10 is generated by the plurality of light emitting diodes 21. The plurality of light emitting diodes 21 are each structured such that a semiconductor chip (not shown) for generating blue light is fitted inside a resin package 21a. Light generated by the semiconductor chips of the light emitting diodes 21 is emitted through lenses (not shown) provided in the packages 21a. The packages 21a of the light emitting diodes 21 are made of a material such as a polycarbonate resin, an acrylic resin, an epoxy resin, or the like.

Figure 3:
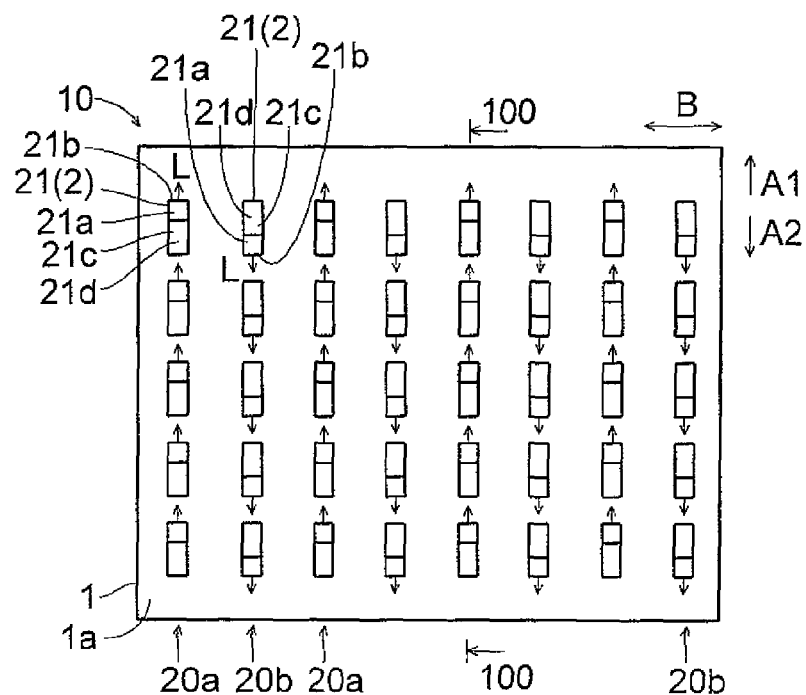
FIG. 3 is a plan view (in which a reflection sheet and an optical sheet are omitted) for illustrating in detail the structure of the backlight unit according to the first preferred embodiment shown in FIG. 1.

As shown in FIGS. 2 and 3, the plurality of light emitting diodes 21 are arranged, as seen in a plan view, in a matrix state. In the first preferred embodiment, a light emission direction "L" of the plurality of light emitting diodes 21 includes a plurality of directions that are parallel or substantially parallel to the mounting surface 1a of the board 1.

Specifically, the plurality of light emitting diodes 21 of the first preferred embodiment are divided into two types of light emitting diode rows 20a and 20b each of which includes two or more light emitting diodes 21 that are arranged in a row. The light emitting diode rows 20a are an example of a "first light emitting diode row" according to a preferred embodiment of the present invention, and the light emitting diode rows 20b are an example of a "second light emitting diode row" according to a preferred embodiment of the present invention.

Each of the two or more light emitting diodes 21 included in each of the light emitting diode rows 20a is disposed such that a light emitting surface 21b thereof faces a predetermined direction (direction A1) along the row direction. Thus, the light emission direction (direction L) of the two or more light emitting diodes 21 included in each of the light emitting diode rows 20a is the predetermined direction (direction A1) that is parallel or substantially parallel to the mounting surface 1a of the board 1 and that is also along the row direction. Incidentally, direction A1 is an example of a "first direction" according to a preferred embodiment of the present invention.

Each of the two or more light emitting diodes 21 included in each of the light emitting diode rows 20b is disposed such that the light emitting surface 21b thereof faces a direction (direction A2) that is opposite to the predetermined direction (direction A1) along the row direction. Thus, the light emission direction (direction L) of the two or more light emitting diodes 21 included in each of the light emitting diode rows 20b is the direction (direction A2) that is parallel or substantially parallel to the mounting surface 1a of the board 1 and is also opposite to the predetermined direction (direction A1) along the row direction. Incidentally, direction A2 is an example of a "second direction" according to a preferred embodiment of the present invention.

In the first preferred embodiment, the light emitting diode rows 20a and 20b are alternately arranged in a direction (direction B) perpendicular or substantially perpendicular to the row direction.

Each of the plurality of light emitting diodes 21 of the first preferred embodiment includes a reflection member 21c having a reflection surface 21d for reflecting light. The reflection member 21c included in each of the light emitting diodes 21 is preferably formed of the same material as the package 21a is formed of, and is preferably formed integrally with the package 21a on the side opposite to the light emitting surface 21b side. Furthermore, the reflection surface 21d of the reflection member 21c of each of the light emitting diodes 21 preferably has a taper shape slanting at a predetermined angle with respect to the mounting surface 1a of the board 1, and this enables the reflection surface 21d to reflect light proceeding to the light emitting diodes 21 side (light proceeding in direction "L") toward the optical sheet 4 side. Incidentally, the reflection member 21c is an example of a "second reflection member" according to a preferred embodiment of the present invention.

As shown in FIGS. 1 and 2, the reflection sheet 3 is a sheet member that is made of foamed PET (polyethylene terephthalate) or the like, and that has a high reflection ratio, and the reflection sheet 3 is adhered to the mounting surface 1a of the board 1. Furthermore, the reflection sheet 3 has openings 3a formed therein through which the plurality of light emitting diodes 21 forming the light source 2 project out of the front surface of the reflection sheet 3. The openings 3a formed in the reflection sheet 3 are formed one for each of the plurality of light emitting diodes 21 forming the light source 2. The reflection sheet 3 that is adhered to the mounting surface 1a of the board 1 reflects light emitted from the light source 2 (the plurality of light emitting diodes 21) toward the optical sheet 4 side.

The optical sheet 4 includes a diffusion plate 41 and a diffusion sheet 42. The diffusion plate 41 is disposed at a predetermined distance from the light source 2 (the plurality of light emitting diodes 21) such that a rear surface (hereinafter, light introduction surface 41a) of the diffusion plate 41 is parallel to the mounting surface 1a of the board 1. As a result, the light emission direction (direction "L") of the plurality of light emitting diodes 21 forming the light source 2 is parallel or substantially parallel to the light introduction surface 41a of the diffusion plate 41. Furthermore, this results in the plurality of light emitting diodes 21 that serve as the light source 2 being located in a space between the mounting surface 1a of the board 1 and the light introduction surface 41a of the diffusion plate 41. The diffusion sheet 42 is disposed on a front surface of the diffusion plate 41.

The diffusion plate 41 included in the optical sheet 4 is a plate member preferably made of a polycarbonate resin, an acrylic resin, or the like, and has a function of making the image of the light source 2 (the plurality of light emitting diodes 21) invisible by diffusing light from the light source 2 (the plurality of light emitting diodes 21). Light is guided into the diffusion plate 41 through the light introduction surface (rear surface) 41a of the diffusion plate 41. Incidentally, in the first preferred embodiment, no light guide plate is provided between the diffusion plate 41 and the light source 2 (the plurality of light emitting diodes 21) for changing light from the light source 2 (the plurality of light emitting diodes 21) into even, planar light. That is, in the first preferred embodiment, light from the light source 2 (the plurality of light emitting diodes 21) is guided into the diffusion plate 41 without a light guide plate.

The diffusion sheet 42 included in the optical sheet 4 is formed of a sheet member made of a polycarbonate resin, an acrylic resin, or the like, and has a function of improving brightness by diffusing and collecting light from the light source 2 (the plurality of light emitting diodes 21). Incidentally, although only a single sheet member is shown in FIGS. 1 and 2 as a member forming the diffusion sheet 42, the diffusion sheet 42 may be formed of a single sheet member, or it may be formed of a plurality of sheet members.

Here, in the first preferred embodiment, a layer 43 containing a fluorescent substance is formed on the light introduction surface 41a of the diffusion plate 41 included in the optical sheet 4. The layer 43 containing the fluorescent substance is provided to convert the wavelength of blue light emitted from the light source 2 (the plurality of light emitting diodes 21) to a wavelength of white light. Incidentally, examples of fluorescent substances capable of converting a wavelength of blue light into a wavelength of white light include YAG (yttrium, aluminum, garnet).

The backlight unit (illuminating device) 10 of the first preferred embodiment is structured as described above.

Also, as shown in FIG. 1, the liquid crystal display panel 50 that receives light from the backlight unit 10 of the first preferred embodiment preferably includes a pair of glass substrates 51 and 52, a liquid crystal layer (not shown) held between the pair of glass substrates 51 and 52, and polarization plates 53 and 54 disposed on a front surface side of the glass substrate 51 and on a rear surface side of the glass substrate 52, respectively.

In the first preferred embodiment, as described above, the light source 2 preferably includes the plurality of light emitting diodes 21 and the light emission direction (direction "L") of the plurality of light emitting diodes 21 forming the light source 2 is parallel or substantially parallel to the light introduction surface 41a of the diffusion plate 41, and thus, light emitted from the light source 2 (the plurality of light emitting diodes 21) is diffused in directions parallel to the light introduction surface 41a of the diffusion plate 41. As a result, the image of the light source 2 (the plurality of light emitting diodes 21) can be made invisible even when the distance between the light source 2 (the plurality of light emitting diodes 21) and the diffusion plate 41 is reduced. Thus, even brightness can be secured while achieving reduced thickness. Furthermore, since light emitted from the light source 2 (the plurality of light emitting diodes 21) is diffused in directions parallel or substantially parallel to the light introduction surface 41a of the diffusion plate 41, there is no need of using a light guide plate. As a result, inconveniences attributable to the use of a light guide plate (that is, increased weight and degraded light use efficiency) can be prevented from occurring.

Thus, with the first preferred embodiment, it is possible to secure even brightness and improve light use efficiency while achieving reduced thickness and weight.

Furthermore, as described above, with the first preferred embodiment, in which light emitted from the plurality of light emitting diodes 21 is diffused in a plurality of directions parallel to the light introduction surface 41a of the diffusion plate 41, the evenness of brightness can be further improved.

Furthermore, as described above, with the first preferred embodiment, in which the light emitting diodes 21 are preferably divided into two types of light emitting diode rows 20a and 20b, since the light emitting diode rows 20a and the light emitting diode rows 20b are alternately arranged in the direction (direction B) that is perpendicular or substantially perpendicular to the row direction, even diffusion of light can be easily achieved.

Furthermore, as described above, with the first preferred embodiment, in which light proceeding to the plurality of light emitting diodes 21 side (light proceeding in direction "L") is reflected toward the optical sheet 4 side by the taper-shaped reflection surface 21d of the reflection member 21c provided on the part of the package 21a located on a side opposite to the light emitting surface 21b side of the package 21a, it is possible to prevent brightness from being lowered in vicinities of portions located opposite to the light emitting surfaces 21b side of the light emitting diodes 21.

Furthermore, in the first preferred embodiment, as described above, the light source 2 preferably includes a plurality of light emitting diodes 21 that emit blue light, and, by converting the wavelength of blue light emitted from the plurality of light emitting diodes 21 of the light source 2 into the wavelength of white light by using the layer 43 (the layer containing a fluorescent substance for converting the wavelength of blue light into the wavelength of white light) formed on the light introduction surface 41a of the diffusion plate 41, conversion of the wavelength of blue light emitted from the plurality of light emitting diodes 21 forming the light source 2 into the wavelength of white light is performed by using the same one layer 43 (the layer containing a fluorescent substance for converting the wavelength of blue light into the wavelength of white light), inconveniences such as unevenness of color can be prevented from occurring.

Figure 4:
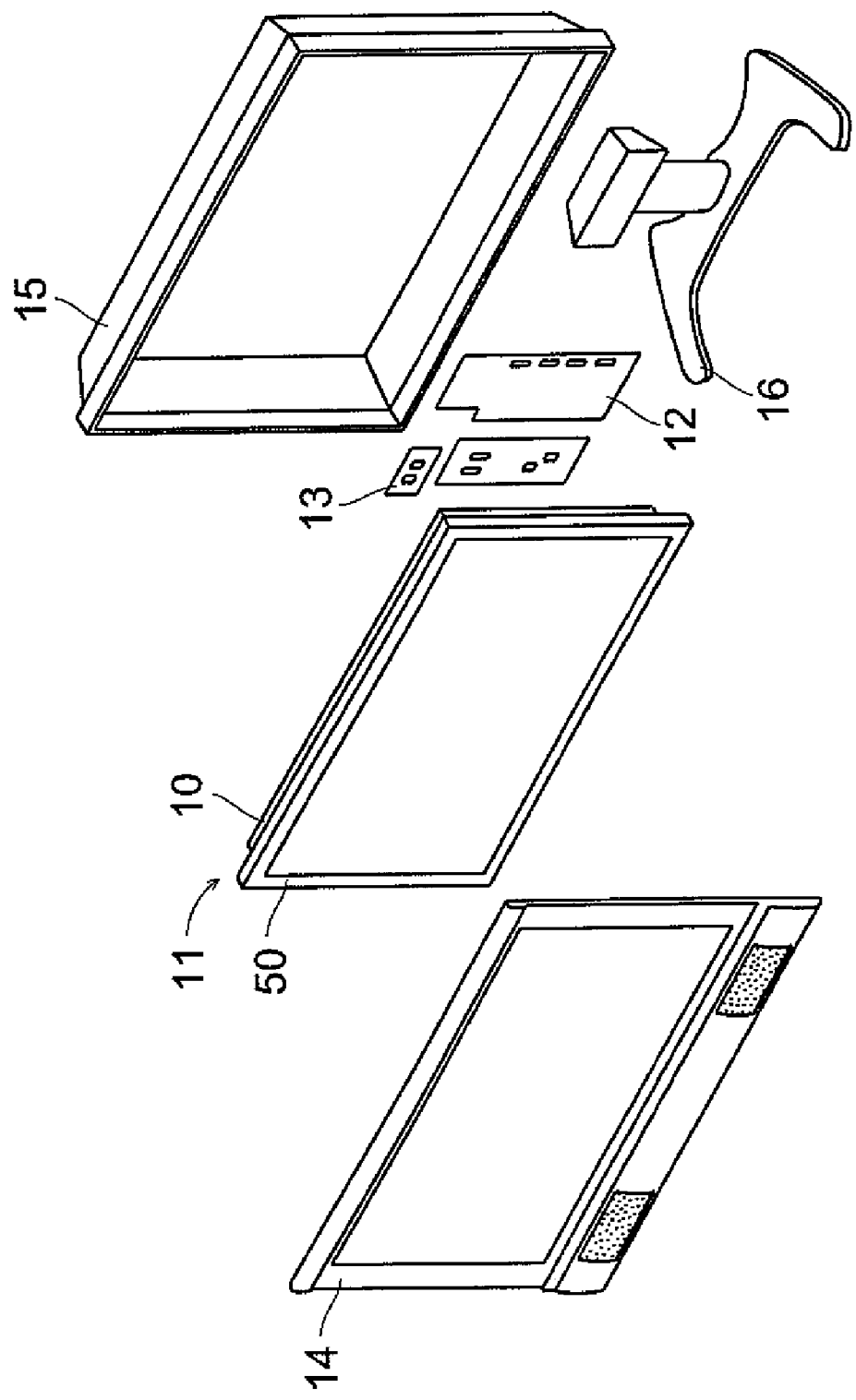
FIG. 4 is an exploded perspective view of a television receiver equipped with a liquid crystal display device using the backlight unit according to the first preferred embodiment shown in FIG. 1.

FIG. 4 is an exploded perspective view of a television receiver equipped with a liquid crystal display device using the backlight unit according to the first preferred embodiment shown in FIG. 1. Next, a description will be given of the structure of the television receiver equipped with the liquid crystal display device using the backlight unit according to the first preferred embodiment, with reference to FIG. 4.

In this television receiver, as shown in FIG. 4, a liquid crystal display device 11 including the above-described backlight unit 10 and the liquid crystal display panel 50 is connected to a power supply 12, a tuner 13, and the like. The liquid crystal display device 11 is held between a front cabinet 14 and a rear cabinet 15 in a state in which the power supply 12, the tuner 13, and the like are connected thereto. The television receiver is supported by a stand 16 that is attached to the rear cabinet 15.

Second Preferred Embodiment

Next, a description will be given of the structure of a backlight unit (illuminating device) according to a second preferred embodiment with reference to FIG. 5.

Figure 5:
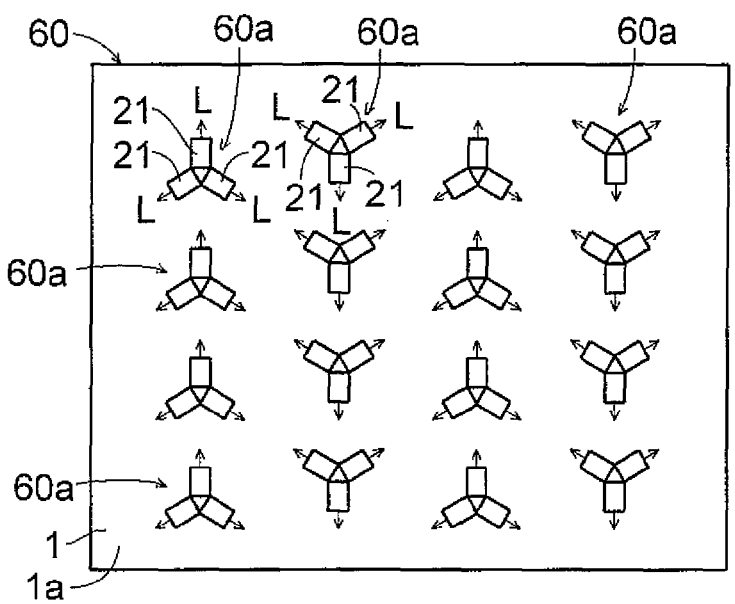
FIG. 5 is a plan view for illustrating in detail the structure of a backlight unit (illuminating device) according to a second preferred embodiment of the present invention.

In a backlight unit (illuminating device) 60 of the second preferred embodiment, as shown in FIG. 5, a plurality of light emitting diodes 21 are divided into a predetermined number of light emitting diode groups 60a, each of which includes three light emitting diodes 21 that are located close to one another. The predetermined number of light emitting diode groups 60a are all arranged on a same one board 1 such that they are distributed over a mounting surface 1a of the board 1. Furthermore, the three light emitting diodes 21 included in each of the predetermined number of light emitting diode groups 60a are arranged such that their light emission directions (directions "L") are different from one another.

In the other respects, the structure of the second preferred embodiment is similar to that of the above-described first preferred embodiment.

With the second preferred embodiment, which is structured as described above, it is possible to easily diffuse light emitted from the plurality of light emitting diodes 21 in a plurality of directions parallel or substantially parallel to the light introduction surface (not shown) of the diffusion plate. Furthermore, since the three light emitting diodes 21 are located close to each other, power can be easily supplied to the three light emitting diodes 21 that are located closed to each other.

In the other respects, the second preferred embodiment achieves advantages similar to those of the above-described first preferred embodiment.

Third Preferred Embodiment

Next, a description will be given of the structure of a backlight unit (illuminating device) according to a third preferred embodiment with reference to FIG. 6.

Figure 6:
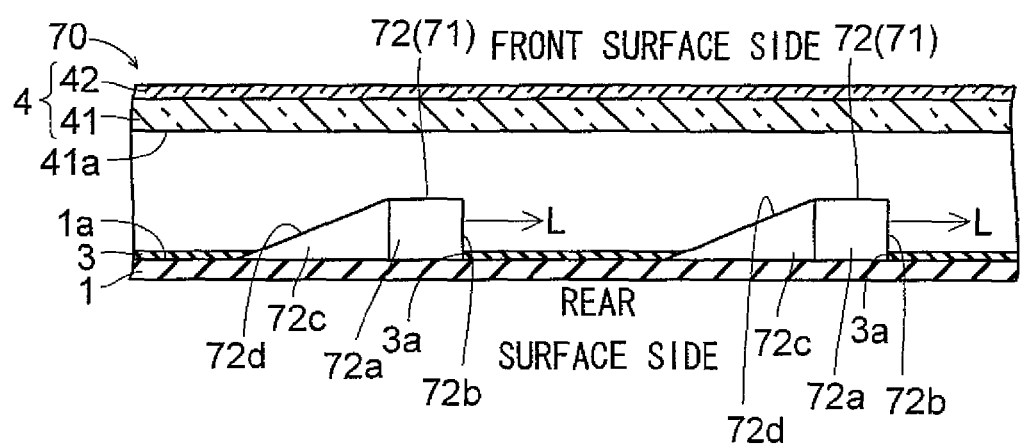
FIG. 6 is a sectional view for illustrating in detail the structure of a backlight unit (illuminating device) according to a third preferred embodiment of the present invention.
Figure 7:
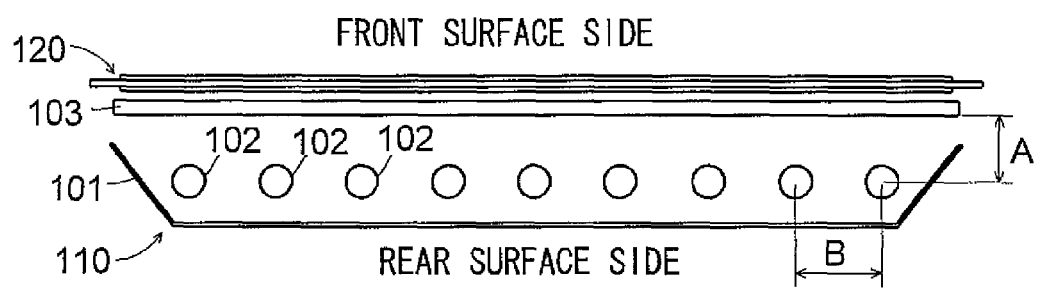
FIG. 7 is a diagram schematically showing an example of the structure of a liquid crystal display device (display device) using a conventional backlight unit (illuminating device).
Figure 8:
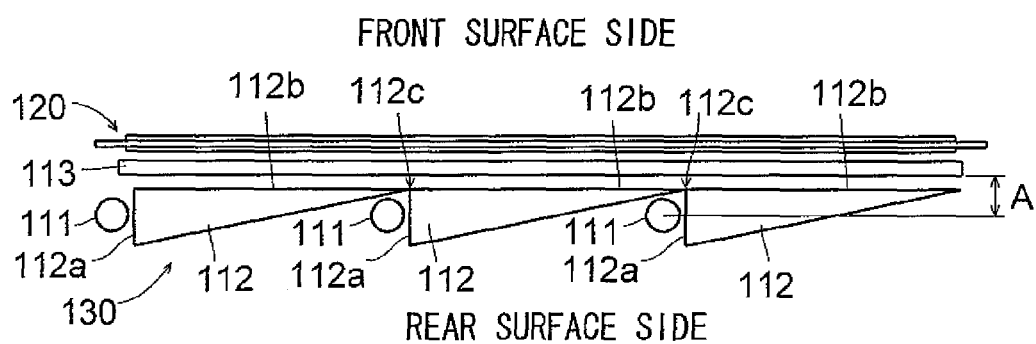
FIG. 8 is a diagram schematically showing an example of the structure of a conventionally proposed backlight unit.

In a backlight unit (illuminating device) 70 of the third preferred embodiment shown in FIG. 6, a light source 71 that emits white light is used. Accordingly, in contrast to the first preferred embodiment in which the light source 2 that emits blue light is used, no layer for converting a wavelength of blue light into a wavelength of white light is formed on a light introduction surface 41a of a diffusion plate 41 included in an optical sheet 4. Here, one way to allow the light source 71 to emit white light is, as shown in FIG. 6, to form the light source 71 of a plurality of light emitting diodes 72 that emit white light. The light emitting diode 72 that emits white light can be realized by forming a layer (not shown) containing YAG on a light emitting surface 72b of a package 72a, inside which a semiconductor chip (not shown) that generates blue light is fitted. Incidentally, like the light emitting diodes 21 of the above-described first preferred embodiment, the plurality of light emitting diodes 72 of the third preferred embodiment each include a reflection member (a second reflection member) 72c having a taper-shaped reflection surface 72d.

Although not illustrated, white light may be generated by using in combination a plurality of light emitting diodes emitting red light, a plurality of light emitting diodes emitting green light, and a plurality of light emitting diodes emitting blue light.

In the other respects, the structure of the third preferred embodiment is similar to that of the above-described first preferred embodiment.

The preferred embodiments disclosed herein are to be considered in all respects as illustrative and not restrictive. The scope of the present invention is set out in the appended claims and not in the description of the preferred embodiments hereinabove, and includes any variations and modifications within the sense and scope equivalent to those of the claims.

For example, although the above-described first to third preferred embodiments deal with examples in which an optical sheet is preferably formed of a diffusion plate and a diffusion sheet, this is not meant to limit the present invention, and the optical sheet may be formed of one diffusion plate imparted with the function of a diffusion sheet as well.

Furthermore, although the above-described first to third preferred embodiments deal with examples in which a reflection member preferably having a taper-shaped reflection surface is integrally formed with a package of a light emitting diode, this is not meant to limit the present invention, and the reflection member having the taper-shaped reflection surface and the package of the light emitting diode may be formed as independent members.

Furthermore, although the above-described first to third preferred embodiments deal with examples in which a reflection member preferably having a taper-shaped reflection surface is integrally formed with a package of a light emitting diode, this is not meant to limit the present invention, and the present invention may be embodied without such a reflection member having a taper-shaped reflection surface.

Furthermore, although the above-described first to third preferred embodiments deal with examples in which a reflection sheet is preferably adhered to a mounting surface of a board, this is not meant to limit the present invention, and a reflection coating may be applied to the mounting surface of the board.

Furthermore, although the above-described first and second preferred embodiments deal with examples in which a layer containing a fluorescent substance is preferably disposed on the light introduction surface side of a diffusion plate, this is not meant to limit the present invention, and a layer containing a fluorescent substance may be disposed on the front surface side of a diffusion plate or on the front surface side of a diffusion sheet. Moreover, a fluorescent substance may be contained in a diffusion plate and the diffusion plate may be used as the layer containing a fluorescent substance as well.

Furthermore, although the above-described second preferred embodiment deals with an example in which a predetermined number of light emitting diode groups are preferably arranged on a mounting surface of a same one board, this is not meant to limit the present invention, and one board may be provided for each of the predetermined number of light emitting diode groups. With this structure, each board can be made small, and this helps achieve cost reduction.

Furthermore, although the above-described second preferred embodiment deals with an example in which three light emitting diodes are preferably included in each of the light emitting diode groups, this is not meant to limit the present invention, and four or more light emitting diodes may be included in each of the light emitting diode groups.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An illuminating device, comprising:
a base;
a light source including of a plurality of light emitting diodes disposed on a mounting surface of the base at a mounting location;
an optical sheet having a light introduction surface that is located facing and at a predetermined distance from the mounting location of the base, and being arranged to at least diffuse light emitted from the plurality of light emitting diodes; and
a first reflection member that is provided on the mounting surface of the base, and that is arranged to reflect light emitted from the plurality of light emitting diodes toward the optical sheet; wherein
a middle portion of a light emitting surface of each of the light emitting diodes is arranged to face a direction parallel or substantially parallel to the light introduction surface of the optical sheet such that a light emission direction of the plurality of light emitting diodes is a direction that is parallel or substantially parallel to the light introduction surface of the optical sheet.

2. The illuminating device of claim 1, wherein the light emission direction of the plurality of light emitting diodes includes a plurality of directions that are parallel or substantially parallel to the light introduction surface of the optical sheet.

3. The illuminating device of claim 1, wherein the plurality of light emitting diodes are divided into a first light emitting diode row and a second light emitting diode row that each include two or more light emitting diodes arranged in a row, a light emission direction of the two or more light emitting diodes included in the first light emitting diode row is a first direction that is parallel or substantially parallel to the light introduction surface of the optical sheet and that is along a row direction, and a light emission direction of the two or more light emitting diodes included in the second light emitting diode row is a second direction that is parallel or substantially parallel to the light introduction surface of the optical sheet and that is opposite to the first direction along the row direction.

4. The illuminating device of claim 3, wherein the first and second light emitting diode rows are arranged alternately in a direction perpendicular or substantially perpendicular to the row direction.

5. The illuminating device of claim 3, further comprising a second reflection member provided on a side opposite to light emitting surfaces of the light emitting diodes, wherein the second reflection member has a taper-shaped reflection surface arranged to reflect light proceeding to the light emitting diodes toward the optical sheet.

6. The illuminating device of claim 1, wherein the plurality of light emitting diodes are divided into a predetermined number of light emitting diode groups that each include two or more light emitting diodes that are located near one another, and light emission directions of the two or more light emitting diodes included in each of the predetermined number of light emitting diode groups are parallel or substantially parallel to the light introduction surface of the optical sheet and different from one another.

7. The illuminating device of claim 1, wherein the plurality of light emitting diodes are arranged to emit blue light, and the optical sheet includes a layer containing a fluorescent substance arranged to convert a wavelength of the blue light emitted from the plurality of light emitting diodes into a wavelength of white light.

8. A display device, comprising the illuminating device of claim 1.

9. A television receiver, comprising the illuminating device of claim 1.

* * * * *